United States Patent
Ino et al.

(10) Patent No.: US 9,013,768 B2
(45) Date of Patent: Apr. 21, 2015

(54) READING APPARATUS

(71) Applicant: Canon Kabushiki Kaisha, Tokyo (JP)

(72) Inventors: Kazushi Ino, Suntou-gun (JP); Atsushi Ogata, Mishima (JP); Ichiro Yasumaru, Mishima (JP); Hiroshi Kato, Odawara (JP); Daisuke Kaneko, Suntou-gun (JP); Hiroki Kato, Gotemba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/265,054

(22) Filed: Apr. 29, 2014

(65) Prior Publication Data
US 2014/0320941 A1 Oct. 30, 2014

(30) Foreign Application Priority Data
Apr. 30, 2013 (JP) .................................. 2013-096016

(51) Int. Cl.
*H04N 1/04* (2006.01)
*H04N 1/00* (2006.01)
*H04N 1/203* (2006.01)

(52) U.S. Cl.
CPC ......... *H04N 1/0058* (2013.01); *H04N 1/00612* (2013.01); *H04N 1/2032* (2013.01)

(58) Field of Classification Search
USPC .................................. 358/498, 497, 496, 474
See application file for complete search history.

(56) References Cited

U.S. PATENT DOCUMENTS

2008/0068681 A1* 3/2008 Ishido ........................... 358/498
2013/0293937 A1  11/2013 Kato et al.

FOREIGN PATENT DOCUMENTS

| JP | 9-261408 A | 10/1997 |
| JP | 2000-36887 A | 2/2000 |
| JP | 2004-289666 A | 10/2004 |
| JP | 2004-289668 A | 10/2004 |
| JP | 2005-89151 A | 4/2005 |
| JP | 2006-279112 A | 10/2006 |
| JP | 2007-180843 A | 7/2007 |

* cited by examiner

*Primary Examiner* — Houshang Safaipour
(74) *Attorney, Agent, or Firm* — Canon USA, Inc., I.P. Division

(57) ABSTRACT

In a reading apparatus including a first conveying device including a first and a second movable unit to cause the sheet to pass through the first position; and a second conveying device including a third and a fourth movable unit to cause the sheet to pass through the second position; characterized in that when the reading device reads the sheet at the first position, a moving velocity of the second movable unit is larger than a moving velocity of the first movable unit, and when the reading device reads the sheet at the second position, a moving velocity of the fourth movable unit is larger than a moving velocity of the third movable unit.

14 Claims, 7 Drawing Sheets

READING APPARATUS

BACKGROUND OF THE INVENTION

1. Field of the Invention

This disclosure relates to a reading apparatus configured to be capable of reading both surfaces of a sheet.

2. Description of the Related Art

In the related art, there are reading apparatus configured to be capable of reading images formed respectively on both surfaces of sheets as original documents. A reading apparatus disclosed in Japanese Patent Laid-Open No. 2005-89151 includes a first conveyance path, a second conveyance path, and a reading device, and the reading device is configured to be movable between a first position at which a first surface of a sheet present in the first conveyance path is read and a second position at which a second surface of the sheet present in the second conveyance path is read. When reading the first surface and the second surface of the sheet, the sheet is conveyed thorough the first conveyance path, and the first surface thereof is read by a reading device at the first position as a first step. Subsequently, the sheet is switched back at a sheet reversing unit and conveyed through the second conveyance path, and the second surface is read by a reading device at the second position.

In order to achieve reading with high degree of accuracy while conveying the sheet, flapping of the sheet or variation in conveyance velocity need to be suppressed during conveyance. However, in the configuration capable of reading the first surface and the second surface of the sheet by switching back the sheet as disclosed in Japanese Patent Laid-Open No. 2005-89151, a method of conveying the sheet stable for reading the sheet with high degree of accuracy is not disclosed.

SUMMARY OF THE INVENTION

This disclosure provides a configuration capable of reading a first surface and a second surface of a sheet by switching back the sheet, so that the sheet can be conveyed stable to achieve reading of the sheet with high degree of accuracy.

This disclosure provides an image reading apparatus including: a first conveyance path configured to convey a sheet; a second conveyance path in which the sheet reversed after passage in the first conveyance path is conveyed; a reading device configured to read the sheet at a first reading position in the first conveyance path and to be capable of reading the sheet at a second reading position in the second conveyance path; a first conveying device configured to pinch and move the sheet at the first movable unit on an upstream side of the first position and a second movable unit on a downstream side of the first position, respectively, with respect to the direction of conveyance of the sheet at the first position to cause the sheet to pass through the first position; and a second conveying device configured to pinch and move the sheet at the second movable unit on an upstream side of the second position and a fourth movable unit on a downstream side of the first position, respectively, with respect to the direction of conveyance of the sheet at the second position to cause the sheet to pass through the second position; wherein when the reading device reads the sheet at the first position, the moving velocity of the first conveying device is larger at the second movable unit than the first movable unit, and when the reading device reads the sheet at the second position, the second conveying device has a larger moving velocity at the fourth movable unit than the third movable unit.

Further features of the present invention will become apparent from the following description of exemplary embodiments with reference to the attached drawings.

DESCRIPTION OF THE EMBODIMENTS

First Embodiment

Referring now to FIG. 1 to FIG. 4, a reading apparatus on the basis of a document conveyance system according to a first embodiment will be described. All of cross-sectional views used in the following description are cross-sectional views viewed in the direction of width of a document P (in a direction orthogonal to the direction of conveyance).

Reading Apparatus

Figure 1:
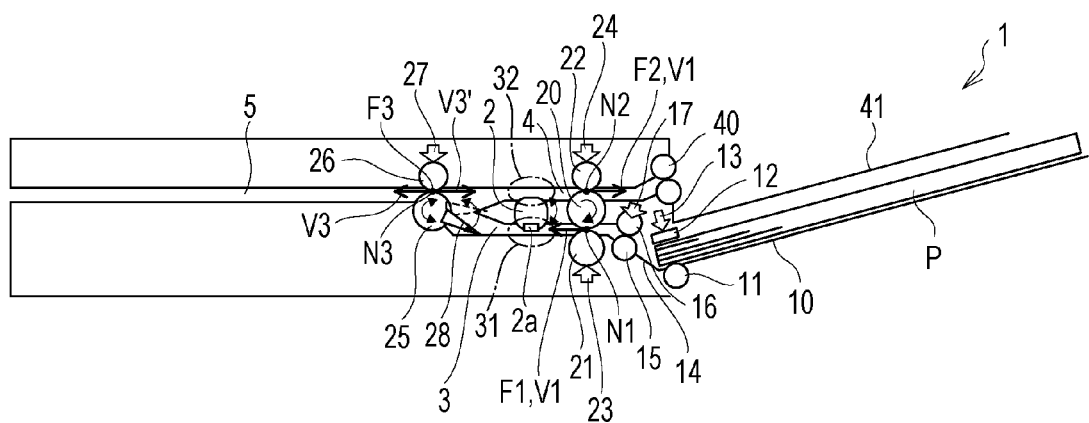
FIG. 1 is a schematic cross-sectional view of a reading apparatus.

FIG. 1 is a schematic cross-sectional view of a reading apparatus 1 on the basis of a sheet conveyance system according to a first embodiment. The reading apparatus 1 on the basis of the sheet conveyance system includes a reading device 2 configured to read an image on a document in the form of a sheet. First of all, a document reading action will be described.

A user places a document on a document placing member 10, presses a read-start button, which is not illustrated, to start the document reading action. The read-start button may be a button arranged on the reading apparatus, or may be a button on an application of a personal computer in which a driver is installed.

When the reading action is started, a paper feeding roller 11 feeds the document P by a paper feeding pressure generated by a paper feeding intermediate plate 12 and a biasing member 13. This disclosure employs a lower surface separating system which supplies sheets on a document placing member 10 in sequence from a sheet on the bottom side. The documents are placed on their face down arranged in sequence from the first, second, ... and Nth document from the bottom. By employing a document supply of the face-down lower surface separating system, the order of the documents is not reversed, and hence documents are discharged in the order of being supplied.

The picked-up document P passes through a separating guide 14, and enters a separation nip formed by a feed roller 15 and a separating roller 16. The feed roller 15 is a drive roller coupled to a drive source (not illustrated), and the separating roller 16 is a driven roller in which a torque limiter is integrated. The separating roller 16 is in press contact with the feed roller 15 with a separating pressure generated by a separating spring 17. When only one piece of document P is supplied, the separating roller 16 is driven by a drive force from the feed roller 15 and a frictional force between surfaces of the document P and the separating roller. However, when a plurality of documents P are fed, that is, when the documents P are fed doubly in a stacked manner, since the stacked documents on the side of the separating roller 16 is not conveyed and only one document in contact with the feed roller 15 is conveyed because a torque of the torque limiter is set to be larger than a take-around torque generated by the frictional force between documents. In this manner, the feed roller 15 and the separating roller 16 are configured to separate the documents P one by one and convey the separated document to the first conveyance path 3.

The first conveyance roller 20 is a rotating member including a contact portion configured to come into contact with the document P, driven to rotate by a motor, which is not illustrated and will be described later, and configured to convey the document P to be read by the reading device 2. A first driven rollers 21 and a second driven rollers 22 come into press contact respectively with the first conveyance roller 20 by a biasing force from a first biasing member 23 and a second biasing member 24, which are springs, to form a first nip N1 and a second nip N2 respectively, and are driven by the first conveyance roller 20. The first conveyance roller 20, the first driven rollers 21, and the second driven rollers 22 constitute a so-called triple roller. When the document P is guided to the first nip N1 of the first conveyance path 3 and the second nip N2 of the second conveyance path 4, the first conveyance roller 20 comes into contact with the document P at the first nip N1 and the second nip N2 respectively, the first nip N1 and the second nip N2 come into contact with the document P, and hence the document is conveyed in a pinched manner. In this manner, with the configuration in which the document P in two conveyance paths is conveyed by the common single first conveyance roller 20, a reduction in size of the apparatus becomes possible in comparison with a case where one each of conveyance roller pair is provided in each conveyance path. Since the number of components is reduced, low cost, ease of assembly, and improved productivity are achieved. The expression "to convey a sheet in a pinched manner" means to convey a sheet by bringing the sheet between two members (the conveyance roller and the driven roller), pinching the sheet between the two members, and translating contact portions on the two members with the sheet.

The document P passing through the nip between the feed roller 15 and the separating roller 16 reaches a first reading position 31 (hereinafter, referred to as a "first position") on the first conveyance path 3, and starts reading of the first surface of the document P. The reading device 2 includes a plurality of image pickup elements (RGB sensors), which is not illustrated, arranged in a direction orthogonal to the direction of conveyance (the direction of axis of rotation of the first conveyance roller 20), and picks up an image on a surface of the document P to read the image on the document P. The reading device 2 includes a cover glass 2a configured to cover a plurality of image pickup elements, and is configured in such a manner that a surface-to-be-read is arranged at an adequate focal depth in a state in which the surface-to-be-read of the document P is in abutment with the cover glass 2a. Since the document P is placed on its face down as described above, a back surface of the document P is read first.

The second conveyance roller 25 is a rotating member including a contact portion that comes into contact with the document P, and configured to be driven by a motor, which is not illustrated, and conveys the document P to be read by the reading device 2. The second conveyance roller 25 and the third driven roller 26 biased by a biasing force of a third biasing member 27, which is a spring, form a nip (a third nip N3) to pinch and convey the document P. The second conveyance roller 25 is configured in such a manner that the direction of rotation thereof can be switched between the normal direction and the reverse direction. The second conveyance roller 25 rotates counterclockwise (defined as a normal rotation) when reading a first surface (back surface) of the document P. Simultaneously, the bifurcating guide 28 is configured to be driven by an actuator, which is not illustrated, and the document fed from the first conveyance path 3 is guided into a joined conveyance path 5 by switching the bifurcating guide 28.

Subsequently, the bifurcating guide 28 is switched to cause the document P to be guided into a second conveyance path 4, and the second conveyance roller 25 switches the direction of rotation from the normal rotation to a reverse rotation, conveys the document P, and reads a second surface (front surface) of the document P. Then, the document P is conveyed by the first conveyance roller 20 and the paper discharge roller pair 40, and is discharged onto a document discharge tray 41.

Figure 2A:
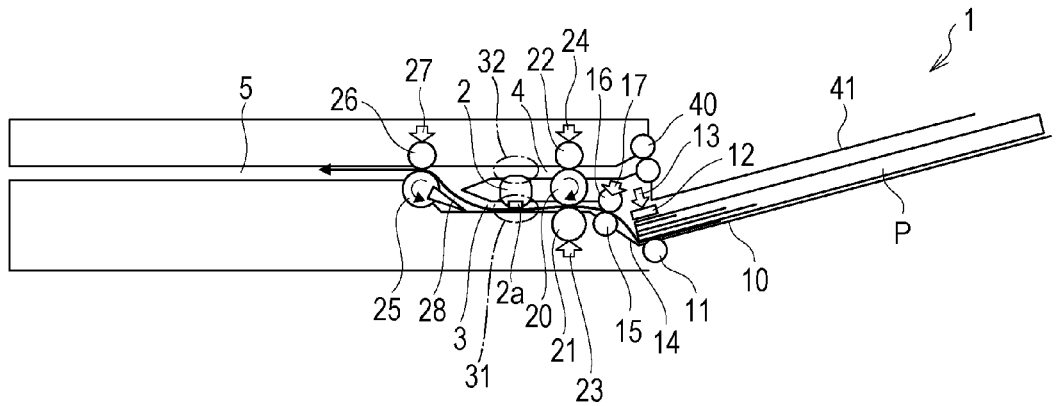
FIG. 2A is a schematic cross-sectional view of the reading apparatus.
Figure 2B:
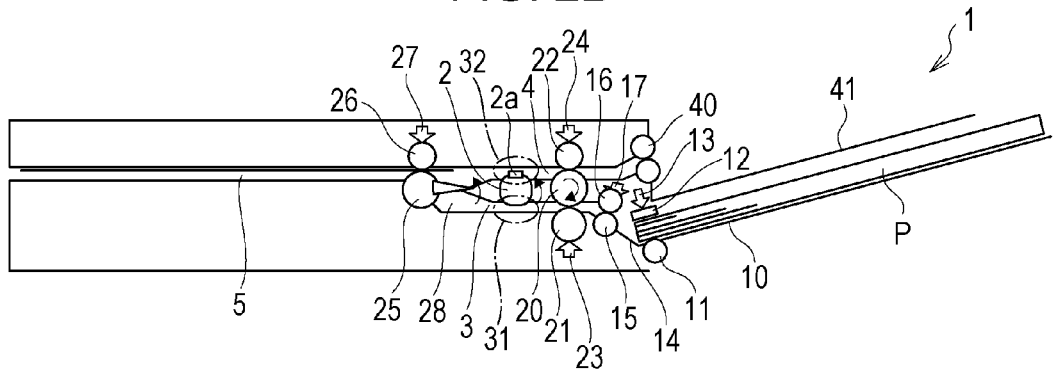
FIG. 2B is a schematic cross sectional view of the reading apparatus.
Figure 2C:
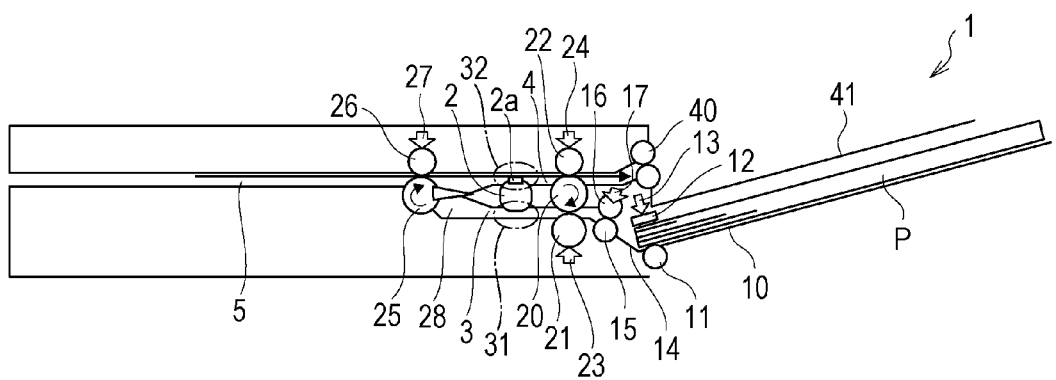
FIG. 2C is a schematic cross-sectional view of the reading apparatus.

Subsequently, a process of reading both surfaces of the document P will be described in detail with reference to FIGS. 2A to 2C. FIGS. 2A to 2C illustrate a reading process for reading the both surfaces of the document P. FIG. 2A illustrates an action of reading the second surface (front surface) of a document, FIG. 2B illustrates a state immediately before switch back of the document, and FIG. 2C illustrates an action of reading the front surface of the document.

The reading device 2 is capable of changing positions of image pickup elements and the cover glass 2a. In other words, when reading the first surface (back surface) of the document P, the reading device 2 is moved to a first position 31 at which the image pickup elements and the cover glass 2a face the document P in the first conveyance path 3 as illustrated in FIG. 2A. In other words, when reading the second surface (front surface) of the document P, the reading device 2 is moved to a second reading position (hereinafter, referred to as a second position) 32 at which the image pickup elements and the cover glass 2a face the document P in the second conveyance path 4 as illustrated in FIG. 2C. In this configuration, the reading device 2 is capable of reading the first surface (back surface) and the second surface (front surface) of the document respectively by using a set of a plurality of image pickup elements.

When reading of the first surface (back surface) of the document P is terminated in FIG. 2A, the reading device 2 rotates counterclockwise, which is a direction indicated by an arrow in FIG. 2B, and moves from the first position 31 to the second position 32. At the same time, the bifurcating guide 28 is switched so as to guide the document P to the second conveyance path 4 and becomes a state illustrated in FIG. 2B. Accordingly, the document P is switched back (reversed so that a trailing edge becomes a leading edge) and conveyed. Subsequently, the direction of rotation of the second conveyance roller 25 which can rotate both in the normal direction and the reverse direction is switched from the normal rotation illustrated in FIG. 2A to the reverse rotation illustrated in FIG. 2C, and starts the reading of the second surface of the document P.

In the state illustrated in FIG. 2C, the reading of the front surface of the document is performed and, subsequently, the document P is discharged through the paper discharge roller pair 40 onto the document discharge tray 41, and the reading action is terminated.

Description of Conveyance Velocity

Subsequently, a method of conveyance relating to a conveyance velocity and a conveyance force of the first and second conveyance rollers will be described with reference to FIGS. 2A to 2C.

Reference sign V1 represents a conveyance velocity of the first conveyance roller 20, and reference signs V3 and V3' represent conveyance velocities of the second conveyance roller 25 at the time of normal rotation and the reverse rotation, respectively.

A conveying device configured to convey the document P through the first conveyance path 3 for reading the first surface of the document when the reading device 2 is at the first position 31 and cause the document P to pass through the first position 31 is defined as a first conveying device. The first conveying device includes a first conveyance roller 20 (first movable unit) on an upstream side of the first position 31 and a second conveyance roller 25 (second movable unit) provided on a downstream side of the first position 31 and configured to rotate in the normal direction with respect to the direction of conveyance of the document P at the first position 31. When a moving velocity V1 of the peripheral surface of the first conveyance roller 20, which corresponds to the conveyance velocity of the first conveyance roller 20, is compared with a moving velocity V3 of a peripheral surface of the second conveyance roller 25, which corresponds to the conveyance velocity of the second conveyance roller 25 at the time of normal rotation, the moving velocity V3 is larger (faster) than the moving velocity V1.

In contrast, a conveying device configured to convey the document P through the second conveyance path 4 for reading the second surface of the document and cause the document P to pass through the second position 32 is defined as a second conveying device. The second conveying device includes the second conveyance roller 25 (third movable unit) provided on an upstream side of the second position 32 and the first conveyance roller 20 (fourth movable unit) provided on a downstream side of the first position 31 and configured to rotate in the reverse direction with respect to the direction of conveyance of the document P at the second position 32. The relationship of the moving velocity V3' of the roller periphery of the second conveyance roller 25, which is the conveyance velocity of the second conveyance roller 25 at the time of reverse rotation and the moving velocity V1 on the surface of the first conveyance roller 20 is such that the moving velocity V1 is larger (faster) than the moving velocity V3'.

To wrap up, following relational expressions $$V1 < V3$$

$$V3' < V1$$

are satisfied.

The moving velocities of the respective rollers are defined such that the moving velocity with respect to the direction of conveyance of the document P when conveying the document P is considered to be positive, so that the values of the moving velocities V1, V3 and V3' are all positive values.

Change-over of the direction of rotation of the second conveyance roller 25 is achieved by changing a drive train by a solenoid. Therefore, the drive trains are set to be different between the normal rotation and the reverse rotation, and hence the reduction ratios are also different between the normal rotation and the reverse rotation. Therefore, the conveyance velocity V3 at the time of normal rotation and the conveyance velocity V3' at the time of reverse rotation are set separately.

In other words, the reduction ratio from the drive source of the second conveyance roller 25 is set to be smaller for the normal rotation than for the reverse rotation.

The first conveyance roller 20, which is a drive roller coupled to the drive source has the same conveyance velocity V1 for both cases where the document P is caused to pass through the first position 31 and where the document P is caused to pass through the second position 32. It is because the first nip N1 and the second nip N2 are formed by the peripheral portion of the identical first conveyance roller 20 having the same outer diameter. In this manner, in this embodiment, the conveyance velocity of the conveyance roller positioned on the downstream of the document P in the downstream of the direction of conveyance is set to be larger than the conveyance velocity of the conveyance roller positioned on the upstream thereof in both cases where the reading device 2 reads the front surface of the document P and where the reading device 2 reads the back surface of the same.

In this manner, the conveyance velocity of the conveyance roller positioned on the downstream of the document P in the upstream of the direction of conveyance is set to be larger than the conveyance velocity of the conveyance roller positioned on the downstream thereof in both cases where the reading device 2 reads the front surface (second surface) and the back surface (first surface). Accordingly, sagging of the document P is suppressed, and the document P is conveyed in a state of coming into abutment with the cover glass 2a of the reading device 2. Therefore, the document P can be read by the reading device 2 with high degree of accuracy, and a high-quality image with reduced probability of occurrence of blur is obtained.

Description of Conveyance Force

Subsequently, a relationship of the conveyance force will be described. Reference signs F1 and F2 represent the conveyance forces of the first and second nips N1, N2 of the first conveyance roller 20, and reference sign F3 of the third nip N3 of the second conveyance roller 25 represents the conveyance force of the third nip N3 of the second conveyance roller 25. The conveyance force F1 at the first nip N1 of the first conveyance roller 20 is larger than the conveyance force F3 of the third nip N3 of the second conveyance roller 25. The conveyance force F3 at the third nip N3 of the second conveyance roller 25 is larger than the conveyance force F2 of the second nip N2 of the first conveyance roller 20.

To wrap up, following relational expressions $$F1 > F3$$

$$F3 > F2$$

are satisfied.

The conveyance force at the respective nips are proportional to a force of pressing the document P (pressing force) as an object to be conveyed against a roller driven by the motor (the first conveyance roller 20 and the second conveyance roller 25) for pinching the document P at the respective nips. In other words, the conveyance force of the first nip N1 is proportional to a biasing force (pressing force) of the first biasing member 23, the conveyance force F2 of the second nip N2 is proportional to a biasing force (pressing force) of the second biasing member 24, and the conveyance force F3 of the third nip N3 is proportional to the biasing force (pressing force) of a third biasing member 27. Therefore, by setting the biasing force of the third biasing member 27 to be smaller than the biasing force of the first biasing member 23, the conveyance force F3 of the third nip N3 is set to be smaller than the conveyance force F1 of the first nip N1. In the same manner, by setting the biasing force of the third biasing member 27 to be larger than the biasing force of the second biasing member 24, the conveyance force F3 of the third nip N3 is set to be larger than the conveyance force F2 of the second nip N2. In other words, the magnitude relationship among the above-described conveyance forces F1, F2, and F3 is the same as the biasing force of the first biasing unit 21, the biasing force of the second biasing member 24, and the biasing force of the third biasing member 27.

In the embodiment disclosed here, in addition to the relationship of the conveyance velocity described above, the conveyance force of the conveyance roller positioned on the upstream of the document P in the direction of conveyance is set to be larger than the conveyance force of the conveyance roller positioned on the downstream thereof in both cases where the reading device 2 reads the front surface (second surface) and the back surface (first surface). Accordingly, the document P is constrained by the conveyance roller upstream in the direction of conveyance. Therefore, the document P is conveyed reliably at the conveyance velocity V1 when the reading device 2 reads the surface (second surface) of the document P, and the document P is conveyed reliably at the conveyance velocity V3' when the reading device 2 reads the back surface (first surface) of the document P. Consequently, sagging of the document P is reliably reduced, and hence the document P can be read by the reading device 2 with high degree of accuracy, so that a high-quality image with reduced probability of occurrence of blur is obtained.

Driving Configuration of Conveyance Roller

Figure 3A:
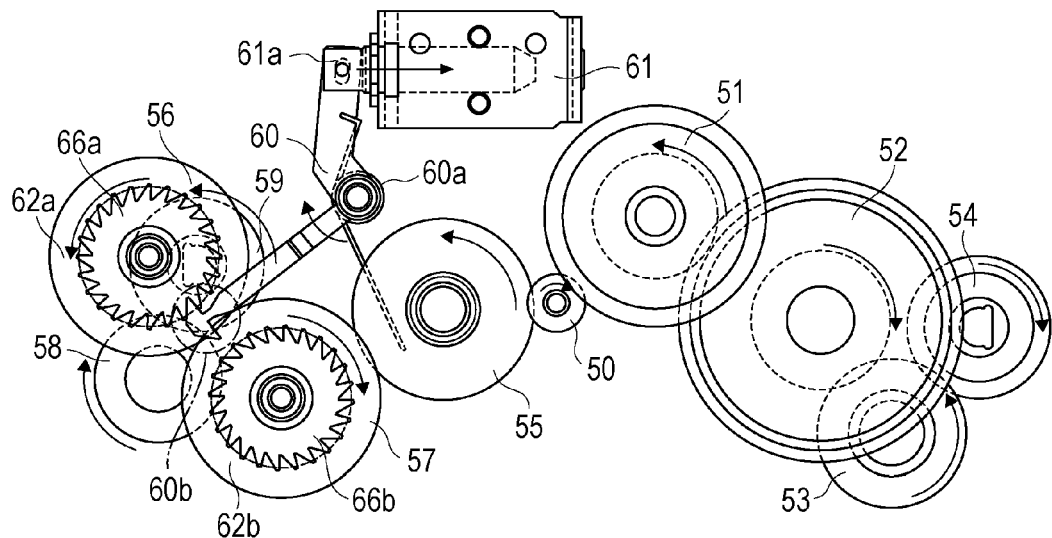
FIG. 3A is a drawing illustrating a driving configuration of each conveyance roller at the time of a normal rotation of a second conveyance roller and FIG. 3B is a drawing illustrating a driving configuration of each conveyance roller at the time of a reverse rotation of the second conveyance roller.
Figure 3B:
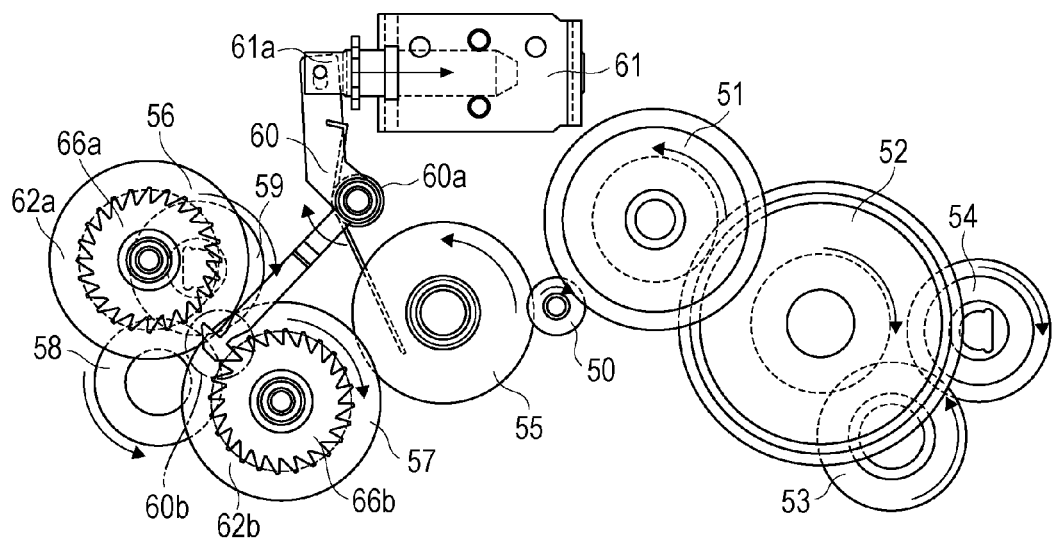
Figure 4:
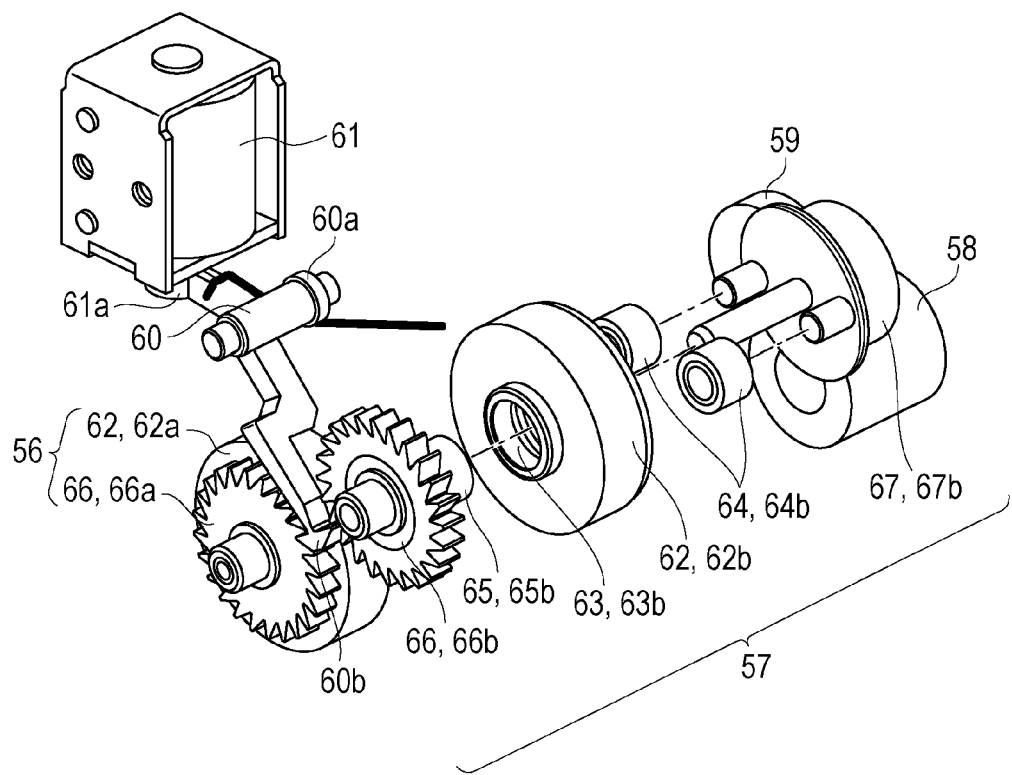
FIG. 4 is an exploded perspective view of a planetary gear clutch of the driving configuration of each conveyance roller.

Subsequently, a driving configuration of the respective conveyance rollers including a drive train for switching the speed of rotation at the time of normal rotation and at the time of reverse rotation of the second conveyance roller 25 will be described. FIGS. 3A and 3B are drawings illustrating the driving configuration of the respective conveyance rollers, in which FIG. 3A illustrates a state in which the second conveyance roller 25 rotates in the normal direction, and FIG. 3B illustrates a state in which the second conveyance roller 25 rotates in the reverse direction. FIG. 4 is an exploded perspective view of a planetary gear clutch configured to switch the rotation of the second conveyance roller 25 between the normal rotation and the reverse rotation in the driving configurations of the respective conveyance rollers.

A motor gear 50 configured to rotate integrally with a shaft of the motor, which is not illustrated, as a drive source engages the idler gear 51 on the right side, so that a drive force is transmitted to a gear 54 fixed to the revolving shaft of the first conveyance roller 20 via idler gears 52 and 53 on the downstream side. The motor gear 50 rotates clockwise in FIGS. 3A and 3B, and the gear 54 also rotate clockwise in FIGS. 3A and 3B.

A drive force transmitting route for transmitting a drive force from the motor to the gear 59 fixed to the revolving shaft of the second conveyance roller 25 is provided on the left side of the motor gear 50.

A mechanism of the drive force transmission from the motor gear 50 to the gear 59 will be described. The drive force transmitting route from the motor gear 50 to the gear 59 is provided with a fourth idler gear 55, a first planetary gear clutch 56, a second planetary gear clutch 57, and a fifth idler gear 58 configured to engage the motor gear 50. The transmission of the drive force to the first planetary gear clutch 56 and the second planetary gear clutch 57 is switched by the switching lever 60 and the change-over solenoid 61. The change-over solenoid 61 is an electromagnetic solenoid, and is configured in such a manner that when an electromagnet is energized, a plunger 61a is attracted and moves rightward, and when the energization of the electromagnet is canceled, the plunger 61a moves leftward by a rotational force biased by the lever spring 60a provided on the revolving shaft of the switching lever 60.

Configurations of the two planetary gear clutches 56 and 57 will be described in more detail with reference to a perspective view in FIG. 4. In FIG. 4, since the first planetary gear clutch 56 and the second planetary gear clutch 57 have the same structure, only the second planetary gear clutch 57 is illustrated in the exploded view.

The two planetary gear clutches 56 and 57 include outer gears 62 (62a and 62b), which are outer gears in charge of input of the drive force from the motor gear and internal gears 63 (63a and 63b), which are internal gears formed integrally with the outer gears 62 on the inside thereof. The two planetary gear clutches 56 and 57 are further provided with planetary gears 64 (64b, 64a in the planetary gear clutch 56 is not illustrated) configured to engage an internal gear 63, and a sun gear 65 (65b, 65a in the planetary gear clutch 56 is not illustrated) configured to engage the planetary gears 64. The two planetary gear clutches 56 and 57 are still further provided with a carrier gear 67 (67b, the 67b in the planetary gear clutch 56 is not illustrated) which axially supports the planetary gears 64.

The sun gear 65 is integrally provided with a locking disk 66 engaging a latch 60b formed integrally at a distal end of the switching lever 60. The internal gear 63, the sun gear 65, and the carrier gear 67 have a configuration in which hole of the sun gear 65 fits on a shaft portion of the carrier gear 67, and hole of the internal gear fits on a shaft portion of the sun gear 65 in order to guarantee coaxial alignment of the internal gear 63, the sun gear 65, and the carrier gear 67.

The drive force transmission from the motor gear 50 is achieved by engagement between the fourth idler gear 55 and the second outer gear 62b, engagement between the second outer gear 62b and the first outer gear 62a, engagement between both of the first and second carrier gear 67a and 67b and a fifth idler gear 58, and engagement between the fifth idler gear 58 and the gear 59.

The planetary gear clutches used in the first embodiment provided at two position are solar planetary gear clutches that output the drive force to the carrier gear 67 when a latch 60b of the switching lever 60 engages a locking disk 66 of the latch 60b, and that idle when the latch 60b does not engage the locking disk 66.

As illustrated in FIG. 3A, when the second conveyance roller 25 rotates in the normal direction, the motor gear rotates clockwise. The plunger 61a of the change-over solenoid 61 is attracted and hence moves rightward, and the latch 60b of the switching lever 60 engaged with the plunger 61a engages the locking disk 66a of the first planetary gear clutch 56. Accordingly, in the first planetary gear clutch 56, the sun gear 65a is not allowed to rotate. Since the outer gear 62a rotates in engagement with the outer gear 62b, the planetary gear 64a makes an orbital movement, and the drive force is transmitted to the carrier gear 67a to rotate the same. With the rotation of the carrier gear 67a, the drive force is transmitted via the fifth idler gear 58 to the gear 59 to rotate the same counterclockwise.

In contrast, the latch 60b of the switching lever 60 does not engage the locking disk 66b of the second planetary gear clutch 57, so that the sun gear 65b is not fixed. Therefore, the sun gear 65b and the planetary gear 64b idle and hence no drive force is transmitted between the outer gear 62b and the carrier gear 67b.

As illustrated in FIG. 3B, when the second conveyance roller 25 rotates in the reverse direction, the direction of rotation of the motor gear is clockwise, which is the same as the case where the second conveyance roller 25 rotates in the normal direction. However, attraction of the plunger 61a of the change-over solenoid 61 is canceled and hence the plunger 61a moves leftward by a biasing force of the lever spring 60a, whereby the latch 60b engages the locking disk 66b. By the engagement of the latch 60b and the locking disk 66b, the sun gear 65b of the second planetary gear clutch 57 is prohibited to rotate. Therefore, since the outer gear 62b rotates by the drive force from the motor gear 50, the planetary gear 64a makes an orbital movement, and the drive force is transmitted to the carrier gear 67b to rotate the same. With the rotation of the carrier gear 67b, the drive force is transmitted via the fifth idler gear 58 to the gear 59 to rotate the same clockwise.

In contrast, in the outer gear 62a, the latch 60b of the switching lever 60 does not engage the locking disk 66a, and hence the sun gear 65a is not fixed. Therefore, the sun gear 65a and the planetary gear 64a idle and hence no drive force is transmitted between the outer gear 62a and the carrier gear 67a.

As described thus far, with the configuration of the drive train in this manner, the motor gear 50 and the first conveyance roller 20 are configured to always rotate clockwise, the second conveyance roller 25 rotates in the normal direction when the change-over solenoid 61 is energized, and the second conveyance roller 25 rotates in the reverse direction when the energization of the change-over solenoid 61 is canceled.

Detailed Description of Conveyance Velocity Setting

Subsequently, detailed setting of the conveyance velocity V1 of the first conveyance roller 20 that rotates at a constant speed, and the conveyance velocities V3, V3' when the second conveyance roller 25 rotates in the normal direction and in the reverse direction will be described.

The drive train illustrated in FIGS. 3A and 3B and FIG. 4 is configured in such a manner that the reduction ratio of the drive train when the second conveyance roller 25 rotates in the reverse direction is larger than the reduction ratio of the drive train when the second conveyance roller 25 rotates in the normal direction. The detailed speed of rotation and the reduction ratio of the drive train and the speeds of the first and second conveyance rollers will be described with a specific example.

Conveyance Velocity of the First Conveyance Roller 20

Since the number of revolution of the motor gear 50 is set to 900 rpm, the reduction ratio from the motor gear 50 to the gear 54 is set to 0.10717, an outer diameter of the first conveyance roller 20 is set to ϕ40 mm, the conveyance velocity V1 of the first conveyance roller 20 is expressed as the following expression, $$V1=900 \text{ (rpm)}/60 \text{ (sec)} \times 0.10717 \times 40 \text{ (mm)} \times \pi \approx 202.01 \text{ (mm/sec)}$$

Reduction Ratio and Conveyance Velocity when Second Conveyance Roller 25 Rotates in the Normal Direction The reduction ratio and the conveyance velocity when the second conveyance roller 25 rotates in the normal direction will be described. The order of the drive force transmitting route from the motor gear 50 to the second conveyance roller 25 at the time of normal rotation and the number of teeth will be shown in Table 1.

TABLE 1

Table 1 Drive Train when Second Conveyance Roller 25 Rotates In Normal Direction

| TRANSMISSION ORDER | GEAR NAME | NUMBER OF GEAR TEETH |
|---|---|---|
| 1 | MOTOR GEAR 50 | 17 |
| 2 | FOURTH IDLER GEAR 55 | 51 |
| 3 | OUTER GEAR 62a | 59 |
| 4 | OUTER TEAR 62b | 59 |
| 5 | INTERNAL GEAR 63b | 48 |
| 6 | PLANETARY GEAR 64b | 16 |
| 7 | CARRIER GEAR 67b | 24 |
| 8 | SUN GEAR 65b | 15 |
| 9 | FIFTH IDLER GEAR 58 | 20 |
| 10 | GEAR 59 | 23 |

From Table 1, the conveyance velocity V3 and the reduction ratio when the second conveyance roller 25 rotates in the normal direction will be calculated from Table 1.

(1) Reduction Ratio from Motor Gear 50 to Internal Gear 63b

The reduction ratio from the (1) reduction ratio from the motor gear 50 to the internal gear 63b is calculated. The numbers of teeth of the outer gears 62a and 62b are set to be the same, and the outer gear 62b and the internal gear 63b are multiple speed gear formed integrally. Therefore, the reduction ratio from the motor gear 50 to the internal gear 63b is expressed by the expression given below.

$$17/51 \times 51/59 \times 59/59 \approx 0.28814$$

(2) Reduction Ratio from the Motor Gear 50 to the Carrier Gear 67b

The reduction ratio from the motor gear 50 to the carrier gear 67b is calculated. It is known that the reduction ratio of the solar planetary gear clutch can be expressed by the following expression, where Za is the number of teeth of the sun gear, and Zc is the number of teeth of the internal gear.

$$\text{Reduction Ratio}=1: \{(Za/Zc)+1\}: \qquad \text{(Expression 1)}$$

The reduction ratio is calculated by substituting the number of teeth into Expression 1.
Since the expression, $$\text{Reduction ratio}=1: \{(15/48)+1\} \approx 1/1.3125 \approx 0.7619$$

is established, and hence the reduction ratio from the motor gear 50 to the carrier gear 67b is expressed by the following expression, $$0.28814 \times 0.7619 \approx 0.21954.$$

(3) Reduction Ratio from the Motor Gear 50 to the Gear 59 at the Time of Normal Rotation When the reduction ratio from the motor gear 50 to the gear 59 is calculated, the following expression is established. That is, the expression $$0.21954 \times 24/20 \times 20/23 = 0.22909$$

(4) Conveyance Velocity V3 of Second Conveyance Roller 25 at the Time of Normal Rotation From the result of calculation from (1) to (3) described above, the conveyance velocity V3 when the second conveyance roller 25 is rotated in the normal direction is calculated. Since the number of revolution of the motor gear 50 is set to the same 900 rpm, and the outer diameter of the second conveyance roller 25 is set to ϕ19 mm, the conveyance velocity V3 of the second conveyance roller 25 is expressed as the following expression, $$V3 = 900 \text{ (rpm)}/60 \text{ (sec)} \times 0.22909 \times 19 \text{ (mm)} \times \pi \approx 205.12 \text{ (mm/sec)}$$

Reduction Ratio and Conveyance Velocity V3' when Second Conveyance Roller 25 Rotates in Reverse Direction The reduction ratio and the conveyance velocity V3' when the second conveyance roller 25 rotates in the reverse direction will be described in the same manner as when the second conveyance roller 25 rotates in the normal direction will be described. The order of the drive force transmitting route from the motor gear 50 to the second conveyance roller 25 at the time of reverse rotation and the number of teeth will be shown in Table 2.

TABLE 2

Table 2 Drive Train when Second Conveyance Roller 25 Rotates In Reverse Direction

| TRANSMISSION ORDER | GEAR NAME | NUMBER OF GEAR TEETH |
|---|---|---|
| 1 | MOTOR GEAR 50 | 17 |
| 2 | FOURTH IDLER GEAR 55 | 51 |
| 3 | OUTER GEAR 62a | 59 |
| 4 | INTERNAL GEAR 63a | 48 |
| 5 | PLANETARY GEAR 64a | 15 |
| 6 | CARRIER GEAR 67a | 24 |
| 7 | SUN GEAR 65a | 17 |
| 8 | FIFTH IDLER GEAR 58 | 20 |
| 9 | GEAR 59 | 23 |

From Table 2, the conveyance velocity V3' and the reduction ratio when the second conveyance roller 25 rotates in the reverse direction is calculated.

(5) Reduction Ratio from Motor Gear 50 to Internal Gear 63a

The reduction ratio from the motor gear 50 to the internal gear 63a is expressed by the expression given below.

$$17/51 \times 51/59 \approx 0.28814$$

(6) Reduction Ratio from Motor Gear 50 to Carrier Gear 67a

The reduction ratio from the motor gear 50 to the carrier gear 67b is calculated. The drive train when the second conveyance roller 25 rotates in the reverse direction also uses the solar planetary gear clutch. Therefore, when the reduction ratio from the internal gear 63a to the carrier gear 67a is calculated, the following expression is satisfied, $$\text{Reduction ratio} = 1 : \{(17/48)+1\} \approx 1/1.35417 \approx 0.73846$$

Therefore, the reduction ration from the motor gear 50 to the carrier gear 67b is expressed by the following expression, $$0.28814 \times 0.73846 \approx 0.21278.$$

(7) Reduction Ratio from Motor Gear 50 to Gear 59 at the Time of Reverse Rotation When the reduction ratio from the motor gear 50 to the gear 59 at the time of reverse rotation is calculated, the following expression is satisfied. That is, the expression $$0.21278 \times 24/20 \times 20/23 = 0.22203$$

(8) Conveyance Velocity V3' when the Second Conveyance Roller 25 Rotates in Reverse Direction
From the result of calculation from (1) to (3) described above, the conveyance velocity V3' when the second conveyance roller 25 is rotated in the reverse direction is calculated. Since the number of revolutions of the motor gear 50 and the outer diameter of the second conveyance roller 25 are the same as when the second conveyance roller 25 rotates in the normal direction, the conveyance velocity V3' when the second conveyance roller 25 rotates in the reverse rotation is expressed by the expression given below.

$$V3' = 900 \text{ (rpm)}/60 \text{(sec)} \times 0.22203 \times 19 \text{(mm)} \times \pi \approx 198.80 \text{ (mm/sec)}$$

As described above, the reduction ratio of the first conveyance roller 20 and the second conveyance roller 25 and the conveyance velocity of the document P are summarized as shown in Table 3.

TABLE 3

Table 3 Reduction Ratio and Conveyance Velocity of First Conveyance Roller 20 and Second Conveyance Roller 25

| ROLLER NAME | REDUCTION RATIO | CONVEYANCE VELOCITY (mm/s) |
|---|---|---|
| FIRST CONVEYANCE ROLLER 20 | 0.10717 | 202.01 |
| SECOND CONVEYANCE ROLLER 25 AT NORMAL ROTATION | 0.22909 | 205.12 |
| SECOND CONVEYANCE ROLLER 25 AT REVERSE ROTATION | 0.22203 | 198.8 |

The reduction ratio or the conveyance velocity described above are examples only, and are not limited thereto. The gear train that drives the first conveyance roller 20 and the second conveyance roller 25 is not limited to the configuration described above, and other known configuration such as various clutches or pendulum gears may be employed.

As described above, according to the embodiment disclosed here, the conveyance velocity of the conveyance roller positioned downstream in the sheet conveyance direction is larger than the conveyance velocity of the conveyance roller positioned upstream in both cases where the reading device 2 reads the first surface of the sheet and where the reading device 2 reads the second surface. In this manner, by setting the conveyance velocity of the movable unit (conveyance roller) arranged upstream and downstream of the reading device, stable conveyance of the sheet is achieved, and hence the sheet can be conveyed so that the sheet can be read with high degree of accuracy.

According to the embodiment disclosed here, the conveyance force of the conveyance roller positioned upstream in the sheet conveyance direction is larger than the conveyance force of the conveyance roller positioned downstream in both cases where the reading device 2 reads the first surface and where the reading device 2 reads the second surface. In this manner, by setting the conveyance force of the movable unit (conveyance roller) arranged upstream and downstream of the reading device, the sheet can be conveyed so that the sheet can be read with high degree of accuracy while suppressing the sagging of the sheet further reliably.

In the first embodiment, the common first conveyance roller 20 conveys the sheet through the first conveyance path 3 and the second conveyance path 4. Therefore, the speeds of rotation of the first conveyance roller 20 at the time of conveying the sheet through the first conveyance path 3 and the second conveyance path 4 is the same. In such a case as well, the speeds of the second conveyance roller 25 are set to be different between the normal rotation and the reverse rotation. Accordingly, the conveyance velocity of the conveyance roller positioned downstream in the sheet conveyance direction is larger than the conveyance velocity of the conveyance roller positioned upstream in both cases where the reading device 2 reads the first surface and where the reading device 2 reads the second surface.

Second Embodiment

Subsequently, reading apparatus on the basis of a document conveyance system according to a second embodiment will be described. In the first embodiment, the conveyance velocities of the second conveyance roller are different between cases where the reading device 2 reads the first surface and where the reading device 2 reads the second surface. In contrast, in the second embodiment, the conveyance velocity of the first conveyance roller is different. Such a configuration will be described. The same configurations as in the first embodiment are denoted by the same reference numerals and description will be omitted. In the same manner as the first embodiment, the moving velocities of the respective rollers are defined such that the moving velocity with respect to the direction of conveyance of the document P when conveying the document P is considered to be positive, and are all positive values.

Figure 5:
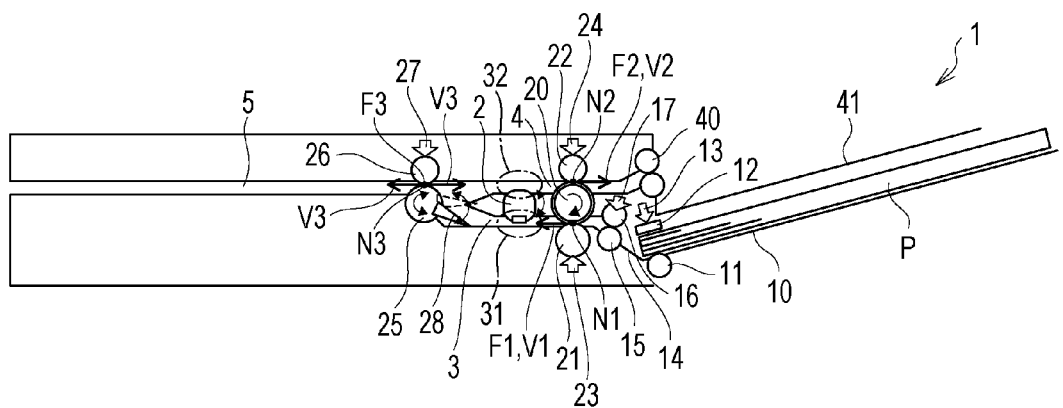
FIG. 5 is a schematic cross-sectional view of the reading apparatus.
Figure 6:
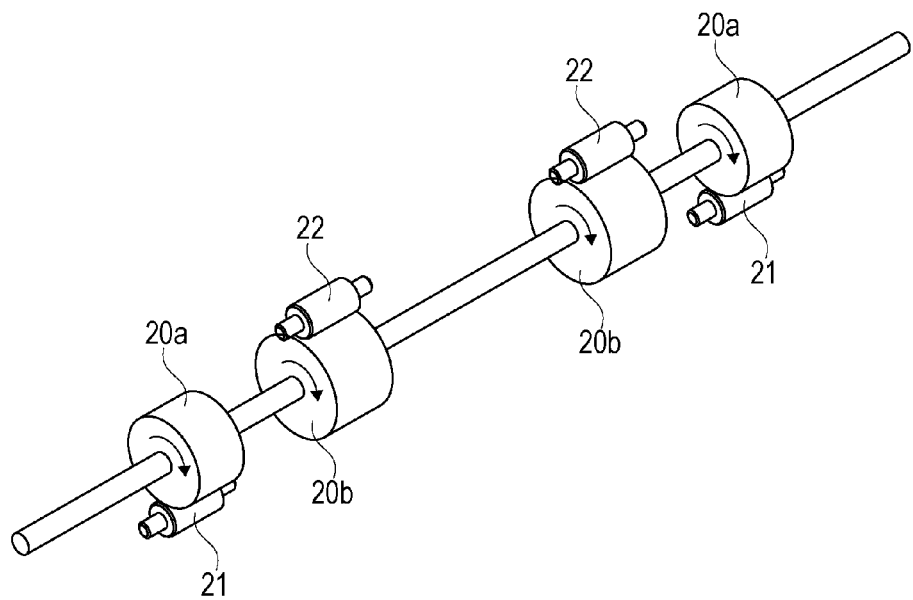
FIG. 6 is a perspective view of a first conveyance roller.

FIG. 5 is a schematic cross-sectional view of the reading apparatus 1 of the second embodiment, and FIG. 6 is a perspective view of the first conveyance roller 20 of the second embodiment. In the second embodiment as well, the reading device 2 of the reading apparatus 1 is configured to rotate after the back surface of the document P has read at the first reading position and read the surface of the document P at the second reading position. The first conveyance roller 20 has a triple roller configuration having the first and second driven rollers 21 and 22 provided at two positions and driven in press contact thereto from both sides by biasing forces from the biasing members 23 and 24 provided at two positions.

The first conveyance roller 20 includes first roller portions 20a and second roller portions 20b having different outer diameter and being fixed to the shaft to which the gear 54 is fixed, and these members rotate integrally. The first roller portions 20a and the second roller portions 20b correspond to first contact surfaces and second contact surfaces that is allowed to come into contact with the sheet, respectively. The first driven rollers 21 come into press contact with the first roller portions 20a, and the second driven rollers 22 come into press contact with the second roller portions 20b. When conveying the document P in the first conveyance path 3 for allowing the reading device 2 to read the document P at the first position 31, the document P is conveyed by the first roller portions 20a and the first driven rollers 21 in a pinched manner. In contrast, when conveying the document P in the second conveyance path 4 for allowing the reading device 2 to read the document P at the second position 32, the document P is conveyed by the second roller portions 20b and the second driven rollers 22 in a pinched manner.

In other words, the first conveying device configured to cause the document P to pass through the first position 31 includes the first roller portions 20a (first movable unit) on an upstream side of the first position 31 and the second conveyance roller 25 (second movable unit) rotating in the normal direction and provided on a downstream side thereof with respect to the direction of conveyance of the document P at the first position 31. In the same manner, the second conveying device configured to cause the document P to pass through the second position 32 includes the second conveyance roller 25 (third movable unit) rotating in the reverse direction on the upstream side of the second position 32 and the first roller portion 20b (fourth movable unit) provided on a downstream side thereof with respect to the direction of conveyance of the document P at the second position 32.

Here, the outer diameter of the first roller portions 20a is set to be smaller than the outer diameter of the second roller portions 20b, and hence the moving velocity (conveyance velocity) $V2$ of the peripheral surface of the second roller portions 20b is larger than the moving velocity (conveyance velocity) $V1$ of the peripheral surface of the first roller portions 20a.

$$V1<V2$$

The expression "the outer diameter of the first roller portions 20a is smaller than the outer diameter of the second roller portions 20b" means that the distance from the center of rotation of the first conveyance roller 20 to the first roller portion 20a, which is a contact surface with respect to the sheet, is smaller than the distance from the center of rotation of the first conveyance roller 20 to the second roller portion 20b, which is a contact surface with respect to the sheet.

The second conveyance roller 25 rotates in the normal direction when the change-over solenoid 61 is energized, and the reading device 2 performs conveyance for reading the document P at the first position 31, and rotates in the reverse direction when the energization of the change-over solenoid 61 is canceled and the reading device 2 performs conveyance for reading the document P at the second position 32. In the second embodiment, the reduction ratio from the motor 50 to the second conveyance roller 25 is the same both when the change-over solenoid 61 is energized and when the energization is released so that the second conveyance roller 25 rotates at the same speed (number of revolutions) for the normal rotation and the reverse rotation. Therefore, the conveyance velocity, which is the moving velocity of the peripheral surface of the second conveyance roller 25, is $V3$ both when the second conveyance roller 25 rotates in the normal direction, and in the reverse direction.

As regards the relationship between the moving velocity $V1$ of the first roller portions 20a and the moving velocity $V3$ of the second conveyance roller 25 at the time of normal rotation, the moving velocity $V3$ is larger than the moving velocity $V1$. As regards the relationship between the conveyance velocity $V3$ of the second conveyance roller 25 at the time of the reverse rotation and the moving velocity $V2$ of the second roller portions 20b, the moving velocity $V2$ is larger than the moving velocity $V3$.

To wrap up, following relational expressions $$V1<V3$$

$$V3<V2$$

are satisfied.

In this manner, the conveyance velocity of the conveyance roller positioned downstream in the direction of conveyance of the document P is set to be larger than the conveyance velocity of the conveyance roller positioned upstream in the direction of conveyance of the document P in both when the reading device 2 reads the document P at the first position 31, and when the reading device 2 reads the document P at the second position 32.

Subsequently, the conveyance forces of the first conveyance roller 20 and the second conveyance roller 25 will be described. The conveyance force F1 of the first conveyance roller 20 at the first nip N1 is larger than the conveyance force F3 of the third nip N3 of the second conveyance roller 25. The conveyance force F3 at the third nip N3 of the second conveyance roller 25 is larger than the conveyance force F2 of the second nip N2 of the first conveyance roller 20.

To wrap up, following relational expressions $F1 > F3$ $F3 > F2$ are satisfied.

In this manner, the conveyance force of the conveyance roller positioned upstream in the direction of conveyance of the document P is set to be larger than the conveyance force of the conveyance roller positioned downstream of the same.
Detailed Description of Conveyance Velocity Setting Subsequently, the conveyance velocity V1 of the first roller portions 20a, the conveyance velocity V2 of the second roller portions 20b and the conveyance velocity V3 of the second conveyance roller 25 will be described with specific numerical values. The reduction ratio from the motors of the respective rollers and the roller outer diameter are shown in Table 4.

TABLE 4

Table 4 Outer Diameter and Reduction Ratio of First Roller Portion 20a, Second Roller Portion 20b, Second Conveyance Roller 25

| PORTION OF ROLLER | | OUTER DIAMETER (mm) | REDUCTION RATIO FROM MOTOR |
|---|---|---|---|
| FIRST CONVEYANCE ROLLER 20 | FIRST ROLLER PORTION 20a | 40 | 0.10717 |
| | SECOND ROLLER PORTION 20b | 40.65 | |
| SECOND CONVEYANCE ROLLER 25 (NORMAL ROTATION AND REVERSE ROTATION) | | 18.85 | 0.22908 |

The motor is rotated at 900 rpm, and the conveyance velocities V1, V2, and V3 or the respective conveyance rollers are calculated. The first conveyance velocity V1 of the first roller portions 20a of the first conveyance roller 20 expressed by the following expression;

$V1 = 900 \text{ (rpm)}/60 \text{ (sec)} \times 0.10717 \times 40 \text{ (mm)} \times \pi \approx 202.01 \text{ (mm/sec)}$.

The conveyance velocity V3 when the second conveyance roller 25 rotates in the normal direction and the reverse direction is expressed by the following expression:

$V3 = 900 \text{ (rpm)}/60 \text{(sec)} \times 0.22908 \times 18.85 \text{ (mm)} \times \pi \approx 203.49 \text{ (mm/sec)}$ The conveyance velocity V2 of the second roller portions 20b of the first conveyance roller 20 is expressed by the following expression:

$V2 = 900 \text{ (rpm)}/60 \text{ (sec)} \times 0.10717 \times 40.65 \text{ (mm)} \times \pi \approx 205.29 \text{ (mm/sec)}$ As described above, the conveyance velocity satisfies the relationships;

$V1 < V3$ $V3 < V2$ so that the conveyance velocity of the conveyance roller positioned downstream of the direction of conveyance of the document P is larger than the conveyance velocity of the conveyance roller positioned upstream of the same.

As described above, according to the embodiment disclosed here, the conveyance velocity of the conveyance roller positioned downstream in the sheet conveyance direction is larger than the conveyance velocity of the conveyance roller positioned upstream in both cases where the reading device 2 reads the first surface of the sheet and where the reading device 2 reads the second surface. In this manner, by setting the conveyance velocity of the movable unit (conveyance roller) arranged upstream and downstream of the reading device, stable conveyance of the sheet is achieved, and hence the sheet can be conveyed so that the sheet can be read with high degree of accuracy.

According to the embodiment disclosed here, the conveyance force of the conveyance roller positioned upstream in the sheet conveyance direction is larger than the conveyance force of the conveyance roller positioned downstream in both cases where the reading device 2 reads the first surface and where the reading device 2 reads the second surface. In this manner, by setting the conveyance force of the movable unit (conveyance roller) arranged upstream and downstream of the reading device, the sheet can be conveyed so that the sheet can be read with high degree of accuracy while suppressing the sagging of the sheet further reliably.

In the first embodiment, the common first conveyance roller 20 conveys the sheet through the first conveyance path 3 and the second conveyance path 4. Therefore, the speeds of rotation of the first conveyance roller 20 at the time of conveying the sheet through the first conveyance path 3 and the second conveyance path 4 is the same. In this case as well, the outer diameter of a portion of the first conveyance roller 20 that conveys the sheet in the first conveyance path 3 the outer diameter of a portion that conveys the sheet in the second conveyance path 4 are differentiated. Accordingly, the conveyance velocity of the conveyance roller positioned downstream in the sheet conveyance direction can be set to be larger than the conveyance velocity of the conveyance roller positioned upstream in both cases where the reading device 2 reads the first surface and where the reading device 2 reads the second surface.

Third Embodiment

The reading apparatus 1 of the first and the second embodiments are apparatuses configured to perform only reading action. A reading apparatus 300 of the third embodiment includes an image forming unit configured to form an image on a recording material in addition to a reading configuration which is the same as the reading apparatus 1 of the first and second embodiments. The members and configurations which are the same as the first and second embodiment such as the same components as those in the reading apparatus 1 are denoted by the same reference signs and description will be omitted.

Figure 7:
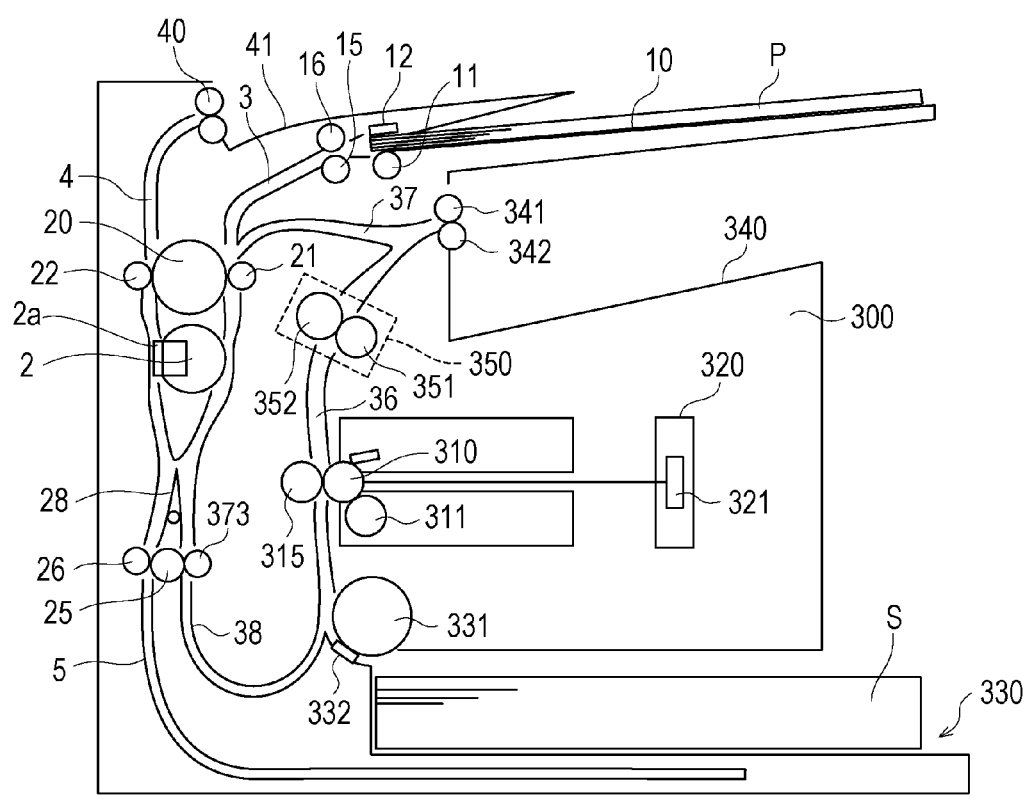
FIG. 7 is a schematic cross-sectional view of the reading apparatus.

FIG. 7 is a schematic cross-sectional view of a reading apparatus 300. The reading apparatus (hereinafter, referred to as "apparatus") 300 of the third embodiment may be considered as an image forming apparatus having an image reading device having the same reading configuration as the reading apparatus 1.

The schematic configuration of the apparatus 300 will be described. The apparatus 300 is provided with a conveyance path 36 configured to convey a recording paper S (sheet-type recording material) from a paper feeding unit 330 arranged in a lower portion of the apparatus 300 to a paper discharge unit 340 arranged on an upper portion of the apparatus 300 arranged therein. In the apparatus 300, in order to convey the recording material S switched back at the time of both-side printing is conveyed again to the conveyance path 36, the recording material S is conveyed in part of the first conveyance path 3 described above. Therefore, the apparatus 300 includes a conveyance path 37 configured to convey the switched-back recording material S to the first conveyance path 3 and a conveyance path 38 configured to convey the recording material S from the first conveyance path 3 to the conveyance path 36.

Image Forming Unit

The apparatus 300 includes a photosensitive drum 310 capable of rotating as a photosensitive member, and a developing roller 311 configured to come into contact with the photosensitive drum 310 and rotate while retaining toner arranged therein. An optical unit 320 configured to irradiate a laser beam is arranged so as to face the photosensitive drum 310. A transfer roller 315 is provided at a position opposing the photosensitive drum 310 with the conveyance path 36 interposed therebetween. A fixing portion 350 is provided in the conveyance path 36 on the downstream side of the transfer roller 315 in the direction of conveyance.

The paper feeding unit 330, the conveyance path 36, the photosensitive drum 310, the developing roller 311, the optical unit 320, the fixing portion 350, the paper discharge unit 340, the conveyance path 36, the conveyance path 37, the first conveyance path 3 and the conveyance path 38 described above function as an image forming unit for forming images on the recording paper S.

Subsequently, the image forming action by the image forming unit will be described. The image forming unit starts an image forming action by receiving a printing signal. The image forming action is as follows. A light-emitting portion 321 provided on the optical unit 320 irradiates the surface of the photosensitive drum 310 charged on the surface thereof by a charging device, which is not illustrated, and rotated, with a laser beam in accordance with the information of image to be printed on the surface thereof. A latent image in accordance with the information of the image to be printed is formed on the surface of the photosensitive drum 310 irradiated with the laser beam. When the developing roller 311 rotates and adheres the retained toner to the surface of the photosensitive drum 310, a toner image corresponding to the latent image is formed on the surface of the photosensitive drum 310.

In contrast, the recording paper S stored in the paper feeding unit 330 is conveyed into the conveyance path 36 piece by piece by the pickup roller 331 and the separating device 332 and the separating device 332. In the conveyance path 36, the recording material S is conveyed to a transfer nip between the photosensitive drum 310 and the transfer roller 315 coincidently with the toner image formed on the surface of the photosensitive drum 310.

The toner image formed on the surface of the photosensitive drum 310 is moved to the position of the transfer nip opposing the transfer roller 315 by the rotation of the photosensitive drum 310, and is transferred onto the recording paper S by a transfer bias applied to the transfer roller 315. The recording paper S on which the toner image is transferred is conveyed to the fixing portion 350, passes through a fixing nip between the heating roller 351 and the pressing roller 352, and the toner image is fixed to the recording paper S. The recording paper S on which the toner image is fixed is conveyed to the downstream side of the fixing portion 350 by the paper discharging rollers 341 and 342.

In the case of the one-side printing that prints only on one surface of the recording paper S, the paper discharging rollers 341 and 342 conveys the recording paper S to the outside of the apparatus as is, and discharge the recording paper S onto the paper discharge unit 340.

In the case of the double-side printing that prints on both surfaces of the recording paper S, the apparatus acts as follows. The recording material S conveyed to the downstream side of the fixing portion 350 is conveyed to a position where a trailing edge of the recording material S passes a bifurcated point between the conveyance path 36 and the conveyance path 37 by the paper discharging rollers 341 and 342. Subsequently, the paper discharging rollers 341 and 342 rotate in the reverse direction, and the recording paper S is guided with the trailing edge changed as a leading edge to the conveyance path 37 by a flapper, which is not illustrated, arranged at the bifurcated point between the conveyance path 36 and the conveyance path 37. This movement is a so-called switch back.

The recording paper S switched back is conveyed to the conveyance paths 37 and 38 by the first conveyance roller 20, the driven roller 21, the second conveyance roller 25, the conveyance roller 373 opposing thereto, and the bifurcating guide (flapper) 28 and is conveyed again to the conveyance path 36. Then, the recording paper S is conveyed to the transfer nip between the photosensitive drum 10 and the transfer roller 15. Subsequently, the toner image is transferred and fixed to another surface (back surface) of the recording paper S and is discharged to the paper discharge unit 340 by the image forming operation, described above. When the recording paper S passes through the conveyance path 37, the recording paper S is at the second position (the second reading position) as illustrated in FIG. 7 so that foreign substances or dirt adhered to the recording paper S are prevented from adhering to the reading device 2, or so that heat from the recording paper S from transferred to the reading device 2.

By the image forming action described above, the image formation is performed on one surface or on both surfaces of the recording paper S.

In the reading apparatus 300 as described above as well, when reading the document P, the first conveyance roller 20, and the second conveyance roller 25 function in the same manner as the first and second embodiments. Therefore, according to the third embodiment, the same advantageous effects as the first and second embodiments are achieved.

Fourth Embodiment

Figure 8:
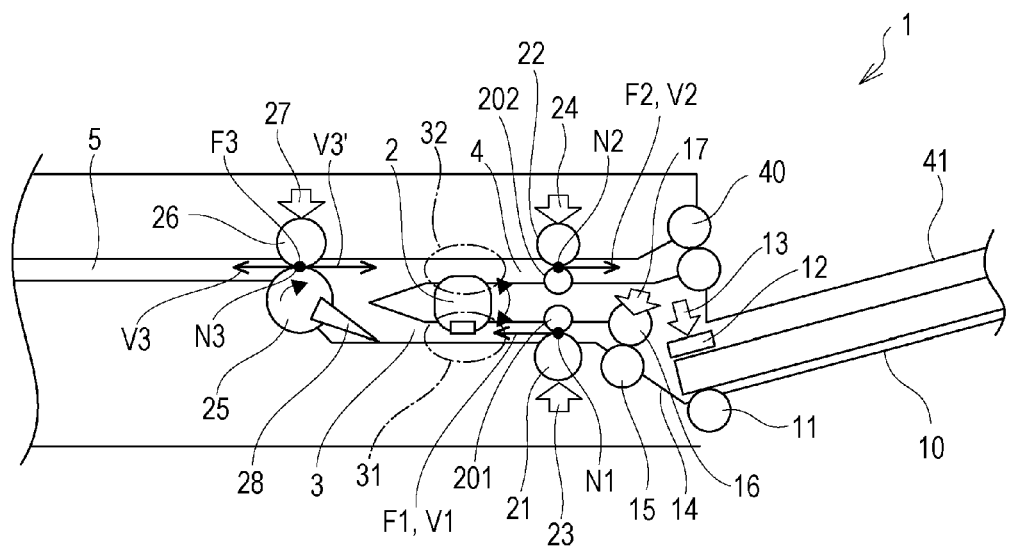
FIG. 8 is a schematic cross-sectional view of the reading apparatus.

In the above-described first to third embodiment, the first conveyance roller 20 is configured to be capable of conveying the document P in the first conveyance path 3 and the second conveyance path 4. However, this disclosure is not limited thereto. In other words, as illustrated in FIG. 8, a conveyance roller 201 configured to convey the document P of the first conveyance path 3 and a conveyance roller 202 configured to convey the document P in the second conveyance path 4 may be provided instead of the first conveyance roller 20. In addition, the conveyance rollers 201 and 202, and the second conveyance roller 25 may be driven by separate motors, respectively.

In other words, the first conveying device includes the conveyance roller 201 as the first movable unit, and the second conveyance roller 25 as the second movable unit, and the second conveying device includes the second conveyance roller 25 as the third movable unit and the conveyance roller 202 as the fourth movable unit. The conditions of the conveyance velocity and the conveyance force are as follows.

Conditions of Conveyance Velocity

The conveyance velocity (the moving velocity of the peripheral surface of the roller) $V1$ of the conveyance roller 201 is smaller than the conveyance velocity $V3$ when the second conveyance roller 25 rotates in the normal direction, and the conveyance velocity (moving velocity of the peripheral surface of the roller) $V2$ of the conveyance roller 202 is larger than the conveyance velocity $V3'$ when the second conveyance roller 25 rotates in the reverse direction.

To wrap up, following relational expressions $$V1 < V3$$

$$V3' < V2$$

The conveyance velocity V3 when the second conveyance roller 25 rotates in the normal direction and the conveyance velocity V3' when the second conveyance roller 25 rotates in the reverse direction may be the same.

Conditions of Conveyance Force

The conveyance force F1 at the first nip N1 of the conveyance roller 201 is larger than the conveyance force F3 of the third nip N3 at the second conveyance roller 25, and the conveyance force F3 of the third nip N3 of the second conveyance roller 25 is larger than the conveyance force F2 of the second nip N2 of the conveyance roller 202. The first relationship and the second relationship needs only to be satisfied.

To wrap up, following relational expressions $$F1 > F3$$

$$F3 > F2$$

are satisfied.

As long as at least the above-described conditions on the conveyance velocity are satisfied, the sheet can be conveyed stably by suppressing sagging so that the sheet can be read with high degree of accuracy in both cases where the reading device 2 reads the first surface and where the reading device 2 reads the second surface.

Other Matters

In the first to fourth embodiments described above, an object to be read by the reading device 2 is an image of the document P. However, the object that the reading device 2 reads is not limited to images on the sheet such as the document P. For example, a configuration in which shading or the like on the surface of the sheet for determining the type of the sheet is also applicable. The reading device 2 is movable between the first position 31 and the second position 32. However, this disclosure is not limited thereto. In other words, for example, a configuration in which the sheet in the first conveyance path 3 and the second conveyance path 4 can be read without moving the reading device 2 such that the reading device 2 is provided with the image pickup elements for the first conveyance path 3 and for the second conveyance path 4 respectively is also applicable. Although the conveyance roller 20 is employed as the first movable unit and the second movable unit, and the conveyance roller 25 is employed as the second movable unit and the third movable unit respectively, the movable units may be an endless conveyance belt extending around a plurality of rollers.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-096016, filed Apr. 30, 2013 which is hereby incorporated by reference herein in its entirety.

What is claimed is:

1. An image reading apparatus comprising:
    a first conveyance path configured to convey a sheet;
    a second conveyance path in which the sheet reversed after passage in the first conveyance path is conveyed;
    a reading device configured to be capable of reading the sheet at a first position in the first conveyance path and to be capable of reading the sheet at a second position in the second conveyance path;
    a first conveying device including a first movable unit disposed upstream of the first position in a sheet conveyance direction at the first position and a second movable unit disposed downstream of the first position in a sheet conveyance direction at the first position, the first and second movable unit pinch and move the sheet to cause the sheet to pass through the first position; and
    a second conveying device including a third movable unit disposed upstream of the second position in a sheet conveyance direction at the second position and a fourth movable unit disposed downstream of the second position in a sheet conveyance direction at the second position, the third and fourth movable unit pinch and move the sheet to cause the sheet to pass through the second position;
    wherein when the reading device reads the sheet at the first position, a moving velocity of the second movable unit is larger than a moving velocity of the first movable unit, and when the reading device reads the sheet at the second position, a moving velocity of the fourth movable unit is larger than a moving velocity of the third movable unit.

2. The image reading apparatus according to claim 1, wherein the moving velocity of the first movable unit when causing the sheet through the first position and the moving velocity of the fourth movable unit when causing the sheet to pass through the second position correspond to the same first velocity, the moving velocity of the second movable unit when causing the sheet to pass through the first position is larger than the first velocity, and the moving velocity of the third movable unit when causing the sheet to pass through the second position is smaller than the first velocity.

3. The image reading apparatus according to claim 2 further comprising:
    a first rotating member provided with a first contact portion, the first contact position moving by the rotation of the first rotating member,
    wherein when causing the sheet to pass through the first position, the first rotating member rotates in a first direction, whereby the first contact portion moves as the first movable unit, and when causing the sheet to pass through the second position, the first rotating member rotates in the first direction, whereby the first contact portion moves as the fourth movable unit.

4. The image reading apparatus according to claim 3 further comprising:
    a second rotating member provided with a second contact portion configured to come into contact with the sheet, the second contact portion being moved by the rotation of the second rotating member,
    wherein when causing the sheet to pass through the first position, the second rotating member rotates in a second direction, whereby the second contact portion moves as the second movable unit, and when causing the sheet to pass through the second position, the second rotating member rotates in the third direction opposite to the second direction, whereby the second contact portion moves as the third movable unit.

5. The image reading apparatus according to claim 4, wherein the first rotating member and the second rotating member are driven to rotate by a common drive source.

6. The image reading apparatus according to claim 4, further comprising:
    a switching device configured to switch the direction of rotation and the speed of rotation of the second rotating member.

7. The image reading apparatus according to claim 1, wherein a pressing force that presses the sheet against the first movable unit is larger than a pressing force that presses the sheet against the second movable unit, a pressing force that presses the sheet against the third movable unit is larger than a pressing force that presses the force against the fourth movable unit.

8. The image reading apparatus according to claim 1, wherein the moving velocity of the second movable unit when causing the sheet to pass through the first position and the moving velocity of the third movable unit when causing the sheet to pass through the second position are the same second velocity, and wherein the moving velocity of the first movable unit when causing the sheet to pass through the first position is smaller than the first velocity, and the moving velocity of the fourth movable unit when causing the sheet to pass through the second position is larger than the second velocity.

9. The image reading apparatus according to claim 8, further comprising:

a first rotating member provided with a first contact surface and a second contact surface configured to be capable of coming into contact with the sheet, wherein the first contact surface and the second contact surface are moved by the rotation of the first rotating member, when causing the sheet to pass through the first position, the first contact surface moves as the first movable unit by the rotation of the first rotating member in the first direction, and when causing the sheet to pass through the second position, the second contact surface moves as the fourth movable unit by the rotation of the first rotating member in the first direction, and the distance between the first contact surface and the center of rotation of the first rotating member is smaller than the distance between the second contact surface and the center of rotation of the first rotating member.

10. The image reading apparatus according to claim 9, further comprising:

a second rotating member provided with a second contact portion coming into contact with the sheet, wherein the second contact portion is moved by the rotation of the second rotating member, when causing the sheet to pass through the first position, the second rotating member rotates in a second direction, whereby the second contact portion moves as the second movable unit, and when causing the sheet to pass through the second position, the second rotating member rotates in the third direction opposite to the second direction, whereby the second contact portion moves as the third movable unit.

11. The image reading apparatus according to claim 10, wherein the first rotating member and the second rotating member are driven to rotate by a common driving source.

12. The image reading apparatus according to claim 8, wherein a pressing force that presses the sheet against the first movable unit is larger than a pressing force that presses the sheet against the third movable unit is larger than a pressing force that presses the sheet against the fourth movable unit.

13. The image reading apparatus according to claim 1, further comprising:

an image forming unit capable of forming an image on a different sheet.

14. The image reading apparatus according to claim 13, further comprising:

a conveyance path configured to convey the different sheet again to the image forming device in order to form an image on a second surface of the different sheet after an image is formed on the first surface of the different sheet, and the part of the conveyance path is a first conveyance path.

* * * * *